(12) United States Patent
Liao

(10) Patent No.: US 11,274,786 B2
(45) Date of Patent: Mar. 15, 2022

(54) ROTARY JOINT OF TELESCOPIC ROD BEARING HIGH LOAD

(71) Applicant: Tsun-Chi Liao, Taichung (TW)

(72) Inventor: Tsun-Chi Liao, Taichung (TW)

( * ) Notice: Subject to any disclaimer, the term of this patent is extended or adjusted under 35 U.S.C. 154(b) by 0 days.

(21) Appl. No.: 16/939,887

(22) Filed: Jul. 27, 2020

(65) Prior Publication Data

US 2022/0026014 A1 Jan. 27, 2022

(51) Int. Cl.
| | |
|---|---|
| *G10D 13/00* | (2020.01) |
| *F16M 13/02* | (2006.01) |
| *F16M 11/10* | (2006.01) |
| *F16C 11/00* | (2006.01) |
| *F16B 2/02* | (2006.01) |
| *F16B 2/06* | (2006.01) |
| *G10D 13/02* | (2020.01) |
| *F16M 11/06* | (2006.01) |
| *F16C 11/10* | (2006.01) |

(52) U.S. Cl.
CPC ............. *F16M 11/10* (2013.01); *F16B 2/065* (2013.01); *F16B 2/02* (2013.01); *F16C 11/10* (2013.01); *F16M 11/06* (2013.01); *F16M 13/022* (2013.01); *F16M 2200/022* (2013.01); *G10D 13/02* (2013.01)

(58) Field of Classification Search
CPC .... F16M 11/10; F16M 13/022; F16M 11/046; F16M 11/048; F16M 11/12; F16M 11/26; F16M 2200/022; F16M 11/041; F16M 11/18; F16B 2/065; F16B 2/10; F16B 2/02; G10D 13/02; G10D 13/28
See application file for complete search history.

(56) References Cited

U.S. PATENT DOCUMENTS

| | | | | |
|---|---|---|---|---|
| 5,756,912 A | * | 5/1998 | Liao | G10D 13/06 84/421 |
| 5,915,742 A | * | 6/1999 | Hung | B62D 65/00 29/281.5 |
| 6,007,032 A | * | 12/1999 | Kuo | F16M 11/10 248/125.1 |
| 7,320,449 B2 | * | 1/2008 | Hsieh | G10D 13/063 248/122.1 |
| 7,560,633 B1 | * | 7/2009 | Wang | G10D 13/02 84/421 |
| 7,717,375 B2 | * | 5/2010 | Chen | F21V 21/26 248/125.7 |

(Continued)

*Primary Examiner* — Tan Le
(74) *Attorney, Agent, or Firm* — Muncy, Geissler, Olds & Lowe, P.C.

(57) ABSTRACT

The present invention provides a rotary joint of a telescopic rod for connecting a bottom pipe and a support pipe, which comprises a base, a support base and a screwing member. The base comprises a first clamp for clamping the bottom pipe and a first pivot plate, and the first pivot plate comprises a guide groove. The support base comprises a second clamp for clamping the support pipe and a second pivot plate, wherein the second pivot plate comprises a through hole, the first pivot plate and the second pivot plate are pivoted together at a pivot point, and when the first pivot plate and the second pivot plate rotate relatively, the through hole is kept to align to the guide groove. The screwing member penetrates through the through hole and the guide groove to clamp and fix the first pivot plate and the second pivot plate.

10 Claims, 5 Drawing Sheets

(56) References Cited

U.S. PATENT DOCUMENTS

| | | | |
|---|---|---|---|
| 7,861,982 B1* | 1/2011 | McClure | F16B 7/0433 |
| | | | 248/74.1 |
| 8,269,088 B1* | 9/2012 | Liao | G10D 13/06 |
| | | | 84/421 |
| 9,310,021 B2 | 4/2016 | Hennessey | |
| 9,633,635 B2 | 4/2017 | Liao | |
| 2011/0121149 A1* | 5/2011 | Herskovic | A61G 7/0503 |
| | | | 248/223.41 |
| 2015/0243267 A1* | 8/2015 | Miyajima | F16M 11/2092 |
| | | | 84/421 |

* cited by examiner

ROTARY JOINT OF TELESCOPIC ROD BEARING HIGH LOAD

FIELD OF THE INVENTION

The invention relates to a rotary joint of a telescopic rod, in particular to a rotary joint of a telescopic rod with high-load bearing.

BACKGROUND OF THE INVENTION

When performing musical instruments or stage performance, a variety of musical instruments and acousto-optic devices may need to be provided to support musical instruments, lighting devices, etc. so as to provide lighting or special effects. For example, a holder disclosed in U.S. Pat. No. 9,633,635 B2 is used in conjunction with a support pipe, and the holder is used to fix various kinds of musical instruments such as brass cymbals, drums, bells, etc. and music scores required for playing, so that the brass cymbals, the drums, the bells, etc. and music scores are arranged beside a player.

Further, different performers have different habits and fondness, so music scores, musical instrument, acousto-optic devices and other devices are required to be placed in the position and angle of personal habits. A rotary joint disclosed in U.S. Pat. No. 9,310,021 B2 has a lower joint and an upper joint, which are connected to a rod body respectively. After a tightening knob of the rotary joint is rotated and loosened, the upper joint and the lower joint can be separated to rotate and change a relative angle of the upper joint and the lower joint, so that a relative inclination angle of the two rod bodies can be adjusted to therefore arrange devices on the rod body so as to adjust them to a required placing angle.

However, in the above-mentioned conventional rotary joint the pivot points of the upper and lower joints and a locking point of the tightening knob are located at the same position, so that when the weight of devices provided on the rod body is too large, the tightening knob may bear an exceed rotation force and may be loosened. Therefore, the upper joint and the lower joint must have a sawtooth-shaped anti-sliding structure which is correspondingly clamped; but when the angle is adjusted, the problems of minimum angle adjustment will be caused, and the tooth will be broken and loosened easily, so that it cannot be correspondingly clamped.

SUMMARY OF THE INVENTION

Accordingly, the main objection of the invention is to provide a rotary joint of a telescopic rod which can meet requirements of freely angle adjustment and can bears a high load.

To achieve the above object, the present invention provides a rotary joint of a telescopic rod for connecting a bottom pipe and a support pipe. The rotary joint of the telescopic rod comprises a base, a support base and a screwing member. The base comprises a first clamp for clamping the bottom pipe and a first pivot plate, wherein the first pivot plate is provided with a guide groove. The support base is provided with a second clamp to clamp the support pipe and a second pivot plate, wherein the second pivot plate is provided with a through hole, the first pivot plate and the second pivot plate are pivoted together at a pivot point, and when the first pivot plate and the second pivot plate rotate relatively, and the through hole is kept to align to the guide groove. The screwing member penetrates through the through hole and the guide groove to clamp and fix the first pivot plate and the second pivot plate, so that the first pivot plate and the second pivot plate cannot rotate relatively.

Accordingly, the base and the support base are respectively connected with the bottom pipe and the support pipe, and the base and the support base can rotate relatively by the pivot jointing of the first pivot plate and the second pivot plate, so that the support pipe can be randomly adjusted according to a required angle. The pivot point is different from the clamping and fixing position of the screwing member, so that a certain distance exists between the pivot point and the clamping and fixing position of the screwing member. Compared with the conventional technology that the pivot point thereof is the clamping and fixing position, the rotary joint of the telescopic rod provided by the invention is able to bear higher load, that is, the support pipe can be used for hanging heavier devices without falling off to meet the use requirement of high load.

DETAILED DESCRIPTION OF THE PREFERRED EMBODIMENTS

The technical content, features and efficacy of the present invention will become apparent from the following detailed description of preferred embodiments in conjunction with the accompanying drawings.

Figure 1:
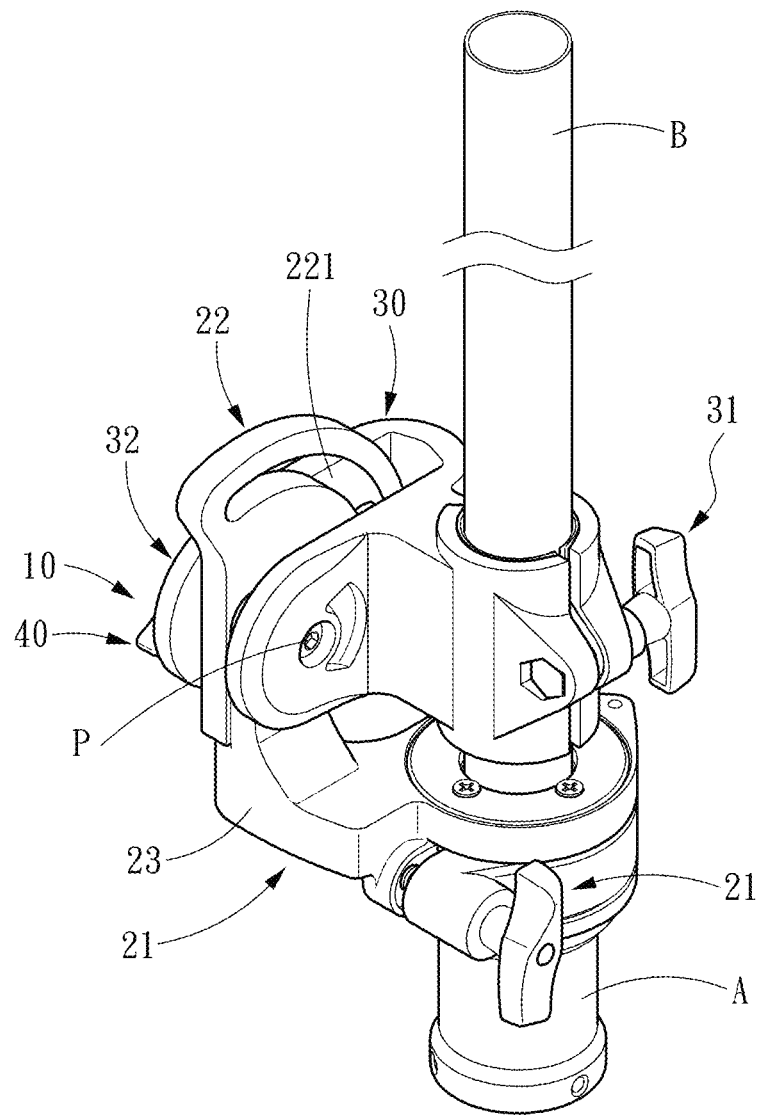
FIG. 1 is a structural view of a rotary joint of a telescopic rod according to the present invention.
Figure 2:
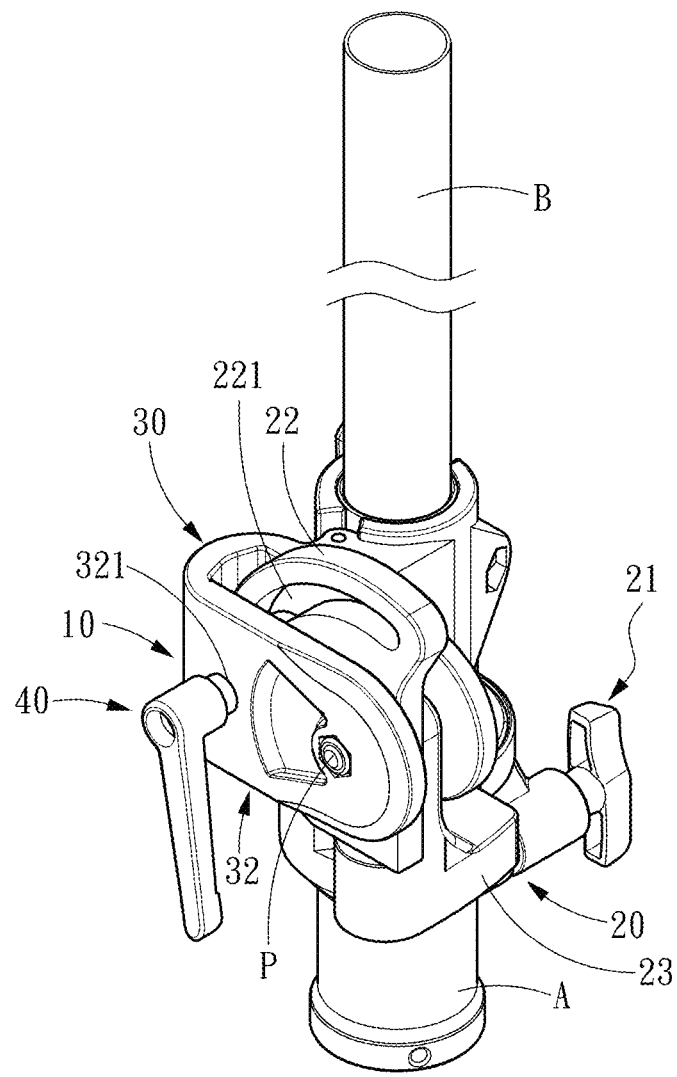
FIG. 2 is a structural view from another angle of the rotary joint of the telescopic rod according to the present invention.
Figure 3:
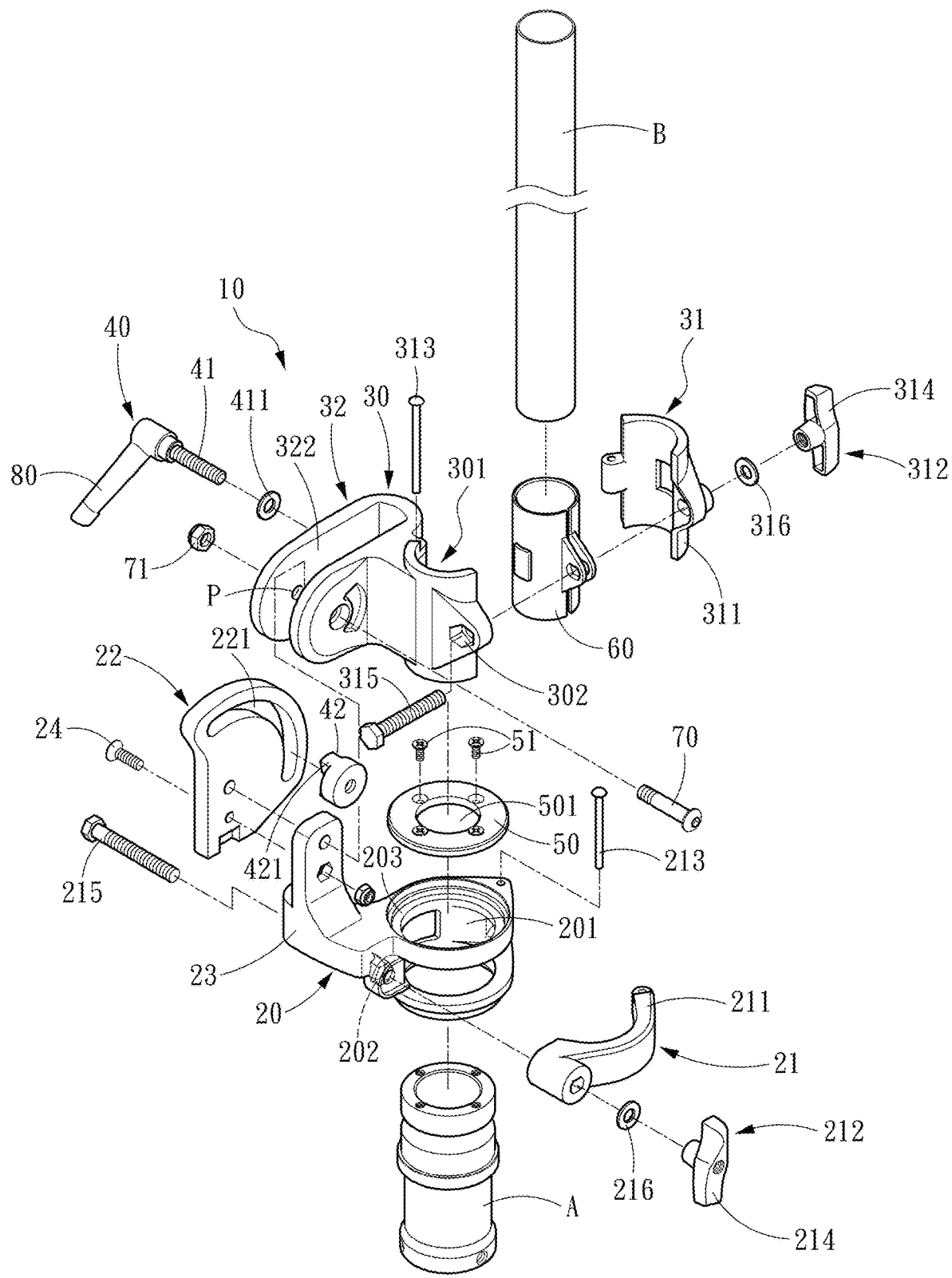
FIG. 3 is a structurally exploded view of the rotary joint of the telescopic rod according to the present invention.

Referring to FIGS. 1, 2 and 3, the present invention provides a rotary joint 10 of a telescopic rod for connecting a bottom pipe A and a support pipe B. The rotary joint 10 of the telescopic rod comprises a base 20, a support base 30 and a screwing member 40, wherein the base 20 comprises a first clamp 21 for clamping the bottom pipe A and a first pivot plate 22. The first pivot plate 22 comprises a guide groove 221.

In an embodiment, the base 20 comprises a first space 201 for the bottom pipe A to be placed, and the first clamp 21 comprises a first arc plate 211 and a first tightening member 212, the first arc plate 211 is adjacent to the first space 201 and is pivoted to the base by a first plug pin 213. The first tightening member 212 comprises a first knob 214 and a first bolt 215, wherein the first bolt 215 penetrates through the base 20 and the first arc plate 211 to be screwed and locked on the first knob 214, and the base 20 is provided with a first depressed slot 202 for the first bolt 215 to press against and block the first bolt 215 from rotating, and the first knob 214 is rotatable to press against the first arc plate 211 to pass into the first space 201, so that the first arc plate 211 clamps the bottom pipe A; and a first circular gasket 216 is arranged between the first knob 214 and the first arc plate 211, and the first circular gasket 216 assists the first knob 214 in pressing against the first arc plate 211. The invention further comprises an upper cover 50 provided on a circular depressed slot 203 of the base 20, wherein the upper cover 50 is configured for suspending and fixing the bottom pipe A by a plurality of screws 51, so as to assist in fixing the bottom pipe A; and the upper cover 50 is provided with an opening 501 for the support pipe B to penetrate through, so that the support pipe B can be sleeved in the bottom pipe A to adjust and reduce the height of the support pipe B.

The base 20 integrally extends out a locking plate 23, and the first pivot plate 22 is fixed on the locking plate 23 by a fixing component 24, so that the first pivot plate 22 and the base 20 are designed separately to reduce the difficulty of manufacturing, and the first pivot plate 22 and the base 20 can be independently replaced and maintained to reduce the cost.

The support base 30 is provided with a second clamp 31 for clamping the support pipe B and a second pivot plate 32. The second pivot plate 32 is provided with a through hole 321, the first pivot plate 22 and the second pivot plate 32 are pivoted together at a pivot point P, and when the first pivot plate 22 and the second pivot plate 32 rotate relatively, the through hole 321 is kept to align to the guide groove 221.

In an embodiment, the support base 30 comprises a second space 301 into which the support pipe B is placed. The second clamp 31 comprises a second arc plate 311 and a second tightening member 312, the second arc plate 311 is adjacent to the second space 301 and is pivoted to the support base 30 by a second plug pin 313. The second tightening member 312 comprises a second knob 314 and a second bolt 315, wherein the second bolt 315 penetrates through the support base 30 and the second arc plate 311 to be screwed and locked on the second knob 314, and the support base 30 is provided with a second depressed slot 302 for the second bolt 315 to press and block the second bolt 315 from rotating. The second knob 314 is rotatable to press against the second arc plate 311 to pass into the second space 301, so that allowing the second arc plate 311 to clamp the support pipe B; and a second circular gasket 316 is arranged between the second knob 314 and the second arc plate 311, and the second circular gasket 316 assists the second knob 314 in pressing against the second arc plate 311. Also, to avoid scratching of the support pipe B, the present invention further comprises a pipe bushing 60, wherein a hardness of the pipe bushing 60 is lower than a hardness of the support pipe B, and the support pipe B is placed in the second space 301 at an interval of the pipe bushing 60.

Further, the second pivot plate 32 may be a U-shaped to form a gap space 322. The first pivot plate 22 is placed in the gap space 322, and the first pivot plate 22 and the second pivot plate 32 are pivoted together at the pivot point P by locking a pivot screw 70 and a pivot nut 71.

The screwing member 40 penetrates through the through hole 321 and the guide groove 221 to clamp and fix the first pivot plate 22 and the second pivot plate 32, so that the first pivot plate 22 and the second pivot plate 32 cannot rotate relatively. In an embodiment, the screwing member 40 comprises a screwing bolt 41 and a slide screw nut 42, the slide screw nut 42 comprises a convex portion 421 that slides on the guide groove 221, and the slide screw nut 42 is placed in the gap space 322 to press against the first pivot plate 22. Further, the screwing bolt 41 penetrates through the through hole 321 and the guide groove 221 to press against the second pivot plate 32 by a circular locking gasket 411, and the screwing bolt 41 is screwed and locked on the slide screw nut 42 to clamp and fix the first pivot plate 22 and the second pivot plate 32. Also, in an embodiment, the present invention further comprises a rotary lever 80 which is fixed to the screwing bolt 41 so as to facilitate a user to rotate the screwing bolt 41.

Figure 4:
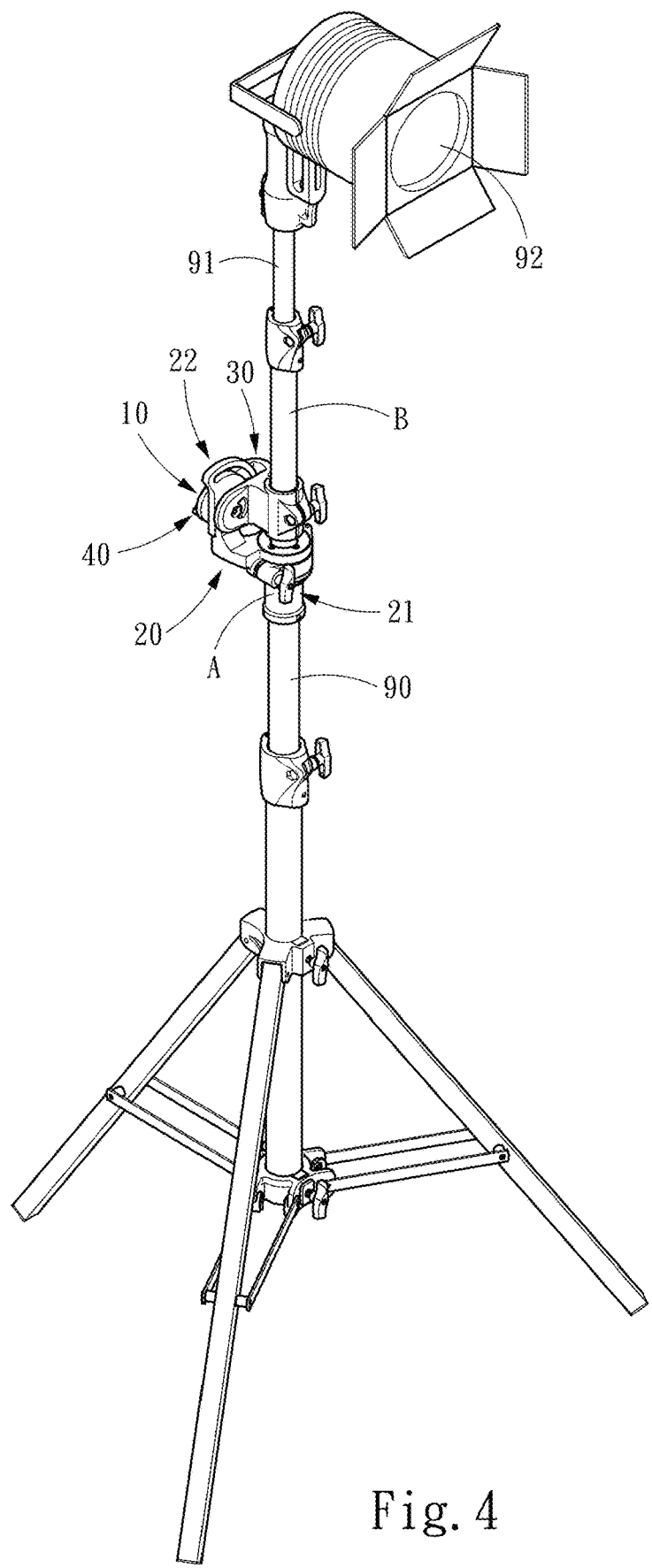
FIG. 4 is a schematic view illustrating installation and use of the present invention.

Referring to FIG. 4, the rotary joint 10 of the telescopic rod of the present invention is used for connecting the bottom pipe A and the support pipe B, and the bottom pipe A can be assembled on a monopod 90; the support pipe B can be provided with a lamplight rod 91, the support pipe B can penetrate the bottom pipe A to adjust the height; and a lamplight 92 is hung on the lamplight rod 91, and the lamplight 92 meets lighting requirements after being lighted up.

Figure 5:
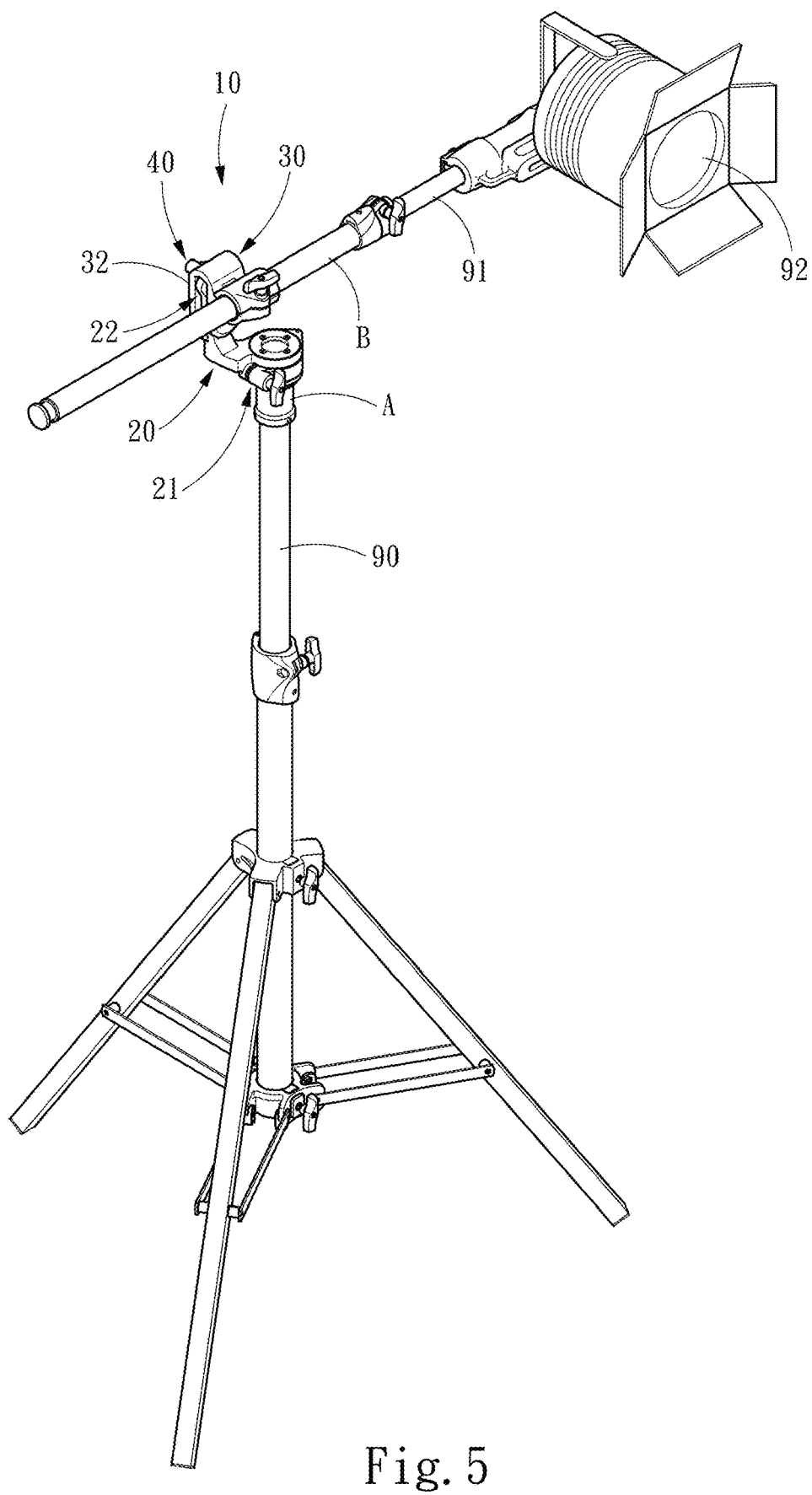
FIG. 5 is a schematic view illustrating installation and use of another embodiment of the present invention.

Referring to FIG. 5, in another embodiment of the present invention, when the lamplight 92 is required for angle adjustment, the support base 30 is rotated relative to the base 20 as long as a user releases the screwing member 40; and when a desired position is adjusted, the screwing member 40 can be re-locked to fix the relative positions of the first pivot plate 22 and the second pivot plate 32 again.

As described above, the features of the present invention include at least the following.

1. The base and the support base are respectively connected with the bottom pipe and the support pipe, and the base and the support base can rotate relatively by the pivot jointing of the first pivot plate and the second pivot plate, so that the support pipe can be randomly adjusted according to a required angle, and the support pipe B can be sleeved into the bottom pipe A and can be vertically used.

2. The pivot point is different from a position where the screwing member is clamped and fixed, so that a certain distance exists between the pivot point and the position where the screwing member is clamped and fixed. Compared with a conventional pivot point which is located at the position for clamping and fixing, the rotary joint of the telescopic rod provided by the invention can have higher load bearing capacity, that is, the support pipe can be used for hanging heavier devices without falling off to meet requirements of freely angle adjustment and high-load bearing.

3. The first pivot plate and the base are separately designed, and the first pivot plate and the base can be independently replaced or maintained, so that the use cost can be reduced.

4. Scratching of the support pipe can be avoided by the arrangement of the pipe bushing.

5. The second pivot plate is U-shaped, so that the load bearing capacity of the rotary joint of the telescopic rod can be increased to meet the requirement of high-load bearing.

What is claimed is:

1. A rotary joint of a telescopic rod for connecting a bottom pipe and a support pipe and bearing a high load, the rotary joint of the telescopic rod comprising:
a base, comprising a first clamp for clamping the bottom pipe and a first pivot plate, wherein the first pivot plate is provided with a guide groove;
a support base, provided with a second clamp to clamp the support pipe and a second pivot plate, wherein the second pivot plate is provided with a through hole, the first pivot plate and the second pivot plate are pivoted together at a pivot point, and when the first pivot plate and the second pivot plate rotate relatively, the through hole is kept to align to the guide groove; and
a screwing member, penetrating through the through hole and the guide groove to clamp and fix the first pivot plate and the second pivot plate, so that the first pivot plate and the second pivot plate cannot rotate relatively.

2. The rotary joint of the telescopic rod of claim 1, wherein the base comprises a first space into which the bottom pipe is placed, and the first clamp comprises a first arc plate and a first tightening member, the first arc plate is adjacent to the first space and is pivoted to the base by a first plug pin, and the first tightening member comprises a first knob and a first bolt, and the first bolt penetrates through the base and the first arc plate to be screwed and locked on the first knob, and wherein the base is provided with a first depressed slot for the first bolt to press against and block the first bolt from rotating, and the first knob is rotatable to press against the first arc plate to pass into the first space, so that the first arc plate clamps the bottom pipe.

3. The rotary joint of the telescopic rod of claim 1, wherein the base integrally extends out a locking plate, and the first pivot plate is fixed on the locking plate by a fixing component.

4. The rotary joint of the telescopic rod of claim 1, wherein the support base comprises a second space into which the support pipe is placed, and the second clamp comprises a second arc plate and a second tightening member, the second arc plate is adjacent to the second space 301 and is pivoted to the support base by a second plug pin, and the second tightening member comprises a second knob and a second bolt, and the second bolt penetrates through the support base and the second arc plate and to be screwed and locked on the second knob, and wherein the support base is provided with a second depressed slot for the second bolt to press and block the second bolt from rotating, and the second knob is rotatable to press against the second arc plate to pass into the second space, so that allowing the second arc plate to clamp the support pipe.

5. The rotary joint of the telescopic rod of claim 4, wherein the rotary joint further comprises a pipe bushing, and a hardness of the pipe bushing is lower than a hardness of the support pipe, and the support pipe is placed in the second space at an interval of the pipe bushing.

6. The rotary joint of the telescopic rod of claim 1, wherein the second pivot plate is U-shaped to form a gap space, the first pivot plate is placed in the gap space, and the first pivot plate and the second pivot plate are pivoted together at the pivot point by locking a pivot screw and a pivot nut.

7. The rotary joint of the telescopic rod of claim 6, wherein the screwing member comprises a screwing bolt and a slide screw nut, the slide screw nut comprises a convex portion sliding on the guide groove, the slide screw nut is placed in the gap space to press against the first pivot plate, the screwing bolt penetrates through the through hole and the guide groove to press against the second pivot plate, and the screwing bolt is screwed and locked on the slide screw nut to clamp and fix the first pivot plate and the second pivot plate.

8. The rotary joint of the telescopic rod of claim 7, wherein the rotary joint further comprises a rotary lever fixed to the screwing bolt.

9. The rotary joint of the telescopic rod of claim 1, wherein the rotary joint further comprises an upper cover provided on a circular depressed slot of the base, and the upper cover is configured for suspending and fixing the bottom pipe by a plurality of screws.

10. The rotary joint of the telescopic rod of claim 9, wherein the upper cover comprises an opening for the support pipe to penetrate through.

* * * * *